Nov. 7, 1939.  E. E. PEASE  2,178,939
BICYCLE FRAME OR THE LIKE
Filed Dec. 24, 1936  2 Sheets—Sheet 1
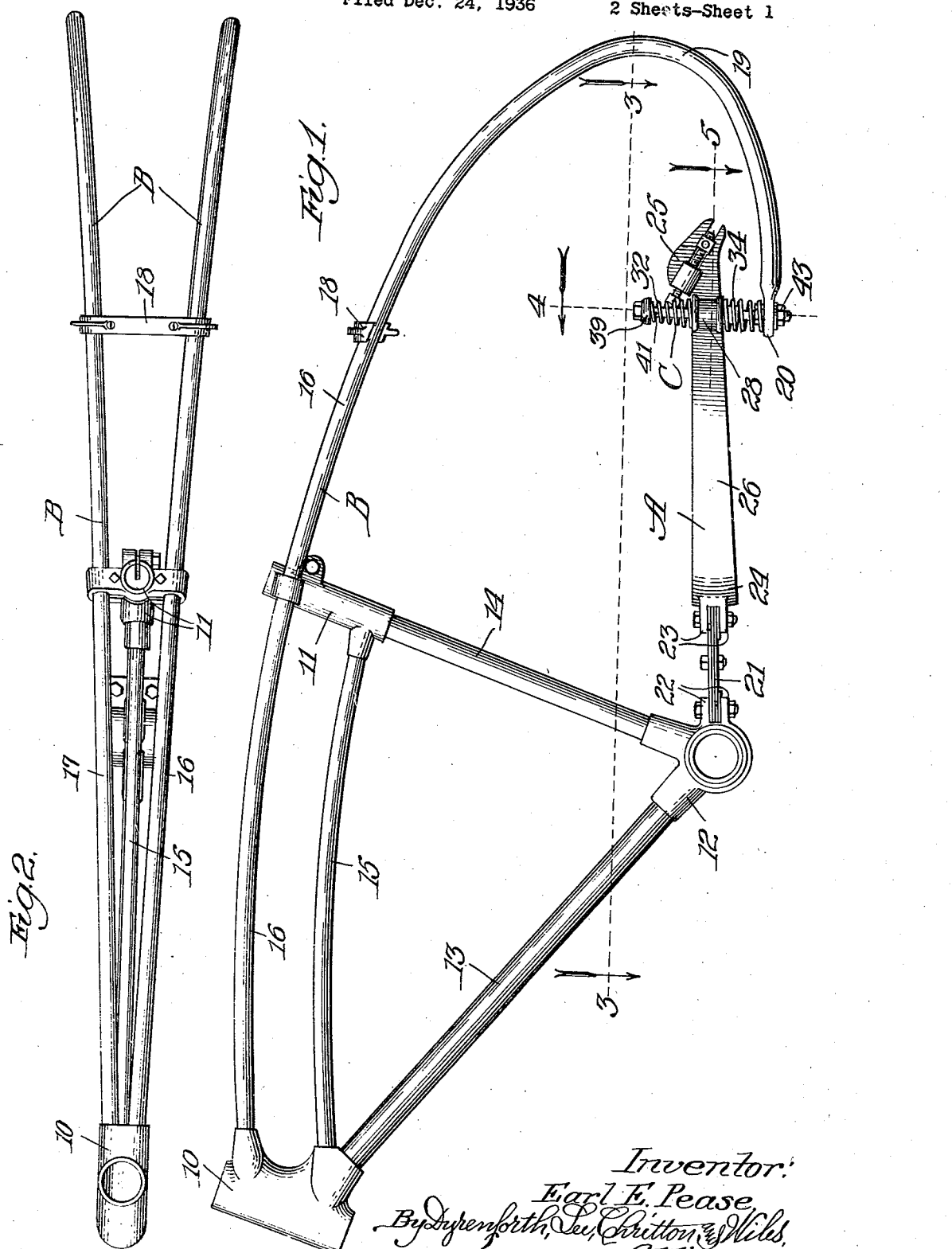
Inventor:
Earl E. Pease
By Dyrenforth, Lee, Chritton & Wiles,
Attys Nov. 7, 1939.　　　　　E. E. PEASE　　　　　2,178,939
BICYCLE FRAME OR THE LIKE
Filed Dec. 24, 1936　　　2 Sheets-Sheet 2
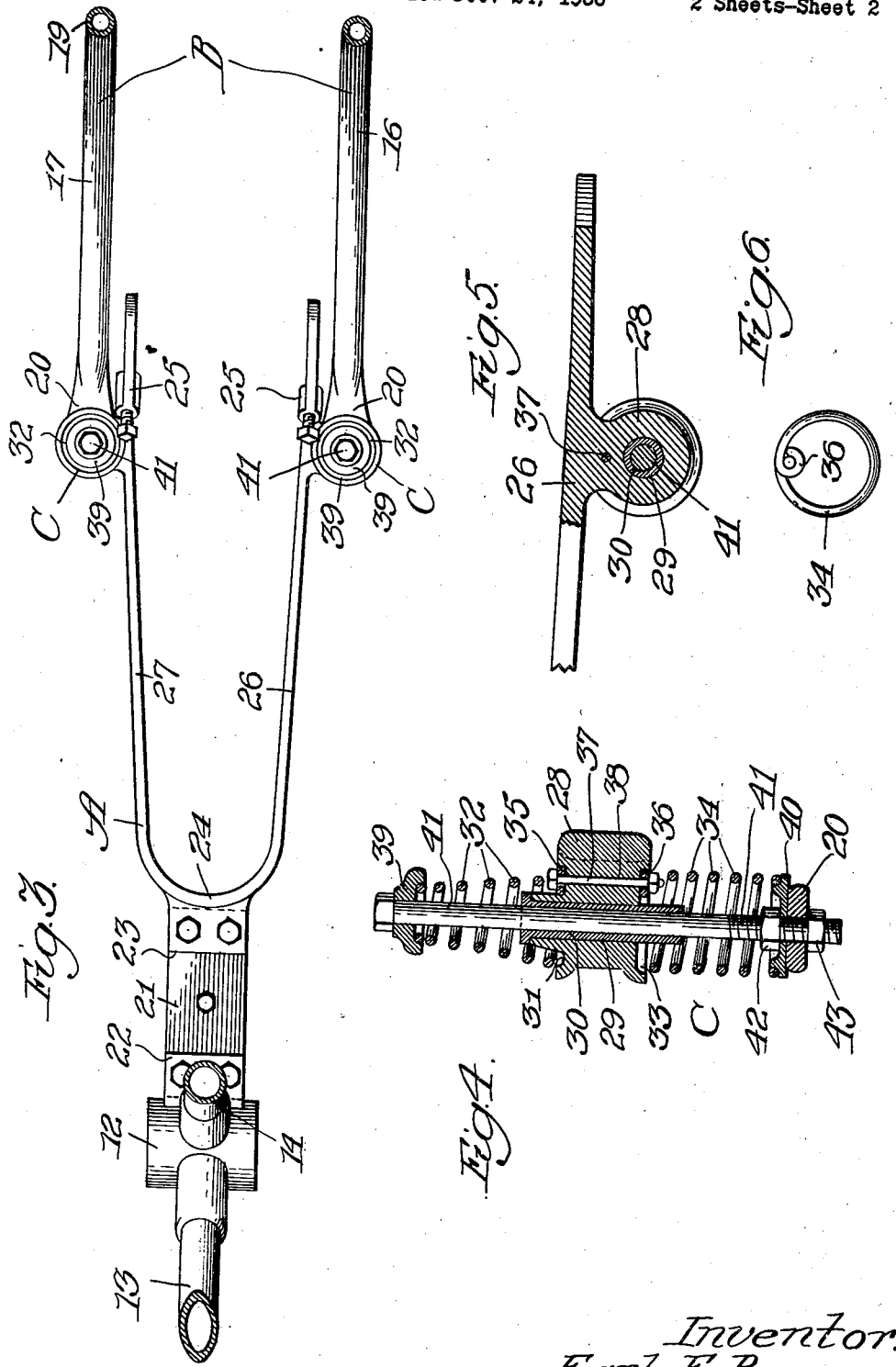
Inventor:
Earl E. Pease
By Dyrenforth, Lee, Chritton & Wiles
Attys Patented Nov. 7, 1939

2,178,939

UNITED STATES PATENT OFFICE 2,178,939

BICYCLE FRAME OR THE LIKE

Earl E. Pease, Mount Prospect, Ill., assignor to Battery Patents Corporation, Chicago, Ill., a corporation of Illinois Application December 24, 1936, Serial No. 117,636

2 Claims. (Cl. 280—283)

This invention relates to a bicycle frame or the like. In some respects, this invention is an improvement on the frame as described in my pending application, Serial No. 81,776.

An object of the invention is to provide a bicycle frame of sturdy construction which will absorb road shocks more readily, and which will yield greater comfort to the rider of the bicycle.

Another object is to provide an improved construction in which the bicycle frame is adapted to be resiliently supported on the rear wheel.

A specific object is to provide a frame construction in which a rear wheel supporting member is resiliently secured to a tube member, the attachment being such that the supporting member is resilient to either upward or downward thrust.

Other objects and advantages will appear as the specification proceeds.

A preferred embodiment of my invention is illustrated in the accompanying drawings in which:

Figure 1 is a view in side elevation of a bicycle frame embodying my invention; Fig. 2, a plan view of the bicycle frame; Fig. 3, a sectional view as seen from line 3—3 of Fig. 1; Fig. 4, a sectional view of the coil spring means employed to secure the members, the section being taken as indicated at line 4 of Fig. 4; Fig. 5, a fragmentary sectional view of the rear end of the supporting member, the section being taken as indicated at line 5 of Fig. 1; and Fig. 6, a detail plan view of the coil spring below the supporting member, and showing the end loop for attachment to the supporting member.

In the illustrations given, A designates a rear wheel shaft support; B, rearwardly extending tube members; and C, spring means for connecting members B to members A.

The general type of frame here employed is described in detail in my pending application, Serial No. 81,776, and only a brief description of the general construction will be given.

The frame includes the head casting 10, the cluster casting 11, and the hanger casting 12. These castings are preferably of aluminum alloy, or other suitable metal of light weight. Hanger casting 12 is connected with head casting 10 by tube 13 which is secured to each of the castings in well known manner. The hanger and cluster castings are connected by tube 14.

Connecting the head and cluster castings is a tube 15 secured at each end to the lower portions of the castings. This tube is centrally aligned with the frame and is slightly curved in the manner of an arch.

The rearwardly extending tube members B comprise the two top tubes 16 and 17 which have their forward ends secured in the top portion of head 10 and extend rearwardly in arched and diverging fashion. These tubes pass through openings in cluster casting 11 and are securely clamped to this casting. The tubes continue their curvature rearward of the cluster casting, curving downward in long sweeping curves and forming large loop portions 19 beyond which are the inwardly turned ends 20.

Connecting the hanger casting 12 with ends 20 of tube members B is the rear wheel shaft support A. Support A is attached to hanger casting 12 by means of a spring 21 which is of the laminated leaf type and has one end secured within ears 22 on hanger casting 12 and has its other end secured within ears 23 on shaft supporting member A. Member A is bifurcated at 24, and at the end of each of the two legs 26 and 27 is a slotted head 25 of well known construction and adapted to hold the rear wheel shaft.

Just forward of heads 25, legs 26 and 27 are attached to the ends 20 of the tube members B by the spring means C. Each of the legs 26 and 27 are equipped with laterally extending bosses 28 which are reinforced and provide suitable seats for the coil springs of means C. Bosses 28 are in the form of cylinders which at one side are integral with the straight portions of legs 26 and 27.

As shown more clearly in Figs. 4 and 5, each of the bosses 28 has a central vertical opening 21 through which extends a bushing 30, preferably made of brass or other suitable material and having an enlarged top end. The top side of the boss is grooved at 31 to provide a seat for top coil spring 32, the bottom side of the boss is recessed at 33 to provide a seat for lower coil spring 34. Both springs 32 and 34 have their ends in the form of loops 35 and 36, as illustrated more clearly in Fig. 5. Bolt 37, extending through opening 38 in boss 28 and through loops 35 and 36, secures each of the springs to boss 28.

The top coil spring 32 is of conical form and at its top end is covered by spring cap 39. The lower coil spring 34 is cylindrical in form and at its bottom end engages spring cap 40. A bolt 41 extends through spring cap 39, down through the center or top spring 32, through bushing 30, and through the center or lower spring 34. The lower portion of bolt 41 extends through spring cap 40 and end 20 of tubes B. Nuts 42 and 43 are adapted to be tightened to bind together spring cap 40 and end 20, and secure bolt 41 to end 20. Both of tubes 16 and 17 or tube members B are connected to legs 26 and 27 of shaft support A in the way just described.

In the operation my my improved frame structure, the shocks which come from a downward or upward thrust, and which are ordinarily transmitted through the frame, are almost wholly absorbed by the spring means here employed in connecting the supporting member. When the rear wheel strikes a bump in the road, the rear axle is thrust upwardly. This causes support A, which is in fixed relation to the axle, to be moved quickly upward at its rearward end. Such movement of shaft support A causes boss 28 to compress top spring 32 and move upwardly toward the head of bolt 41. In order for the rear end of support A to move upwardly, the forward end of this member must bend slightly. The leaf spring 21 is flexible and all the necessary bending may take place within this spring.

When the bump is passed, or when the rear wheel falls into a depression, the rear axle is thrust downwardly and support A moves quickly downward at its rear end. This causes the compression in top spring 32 to be quickly relieved and lower spring 34 to be compressed.

This spring action may continue as the bicycle moves along an irregular surface and the tube members B are relieved from the sharp shocks they would ordinarily receive. A severe shock, where either top or bottom springs are compressed near their limits, may be partially transmitted to the ends 20 of tube members B. The tubes 16 and 17 are themselves slightly resilient because of the large loops 19 in these members and they are able to absorb much of the shock not already taken up by the spring means C.

The spring means C may be adjusted for firmness by loosening nuts 42 and 43, pushing bolts 41 farther through ends 20 and again tightening the nuts. This puts springs 32 and 34 under greater compression, and vertical movement of the rear wheel support A is more strongly resisted.

Due to the fact that the weight of the frame and the rider of the bicycle is carried by the top springs 32, these springs are preferably stronger than springs 34 and may be somewhat longer, so that as the bicycle is being ridden the bosses 28 move up and down along the central portion of bolt 41.

While in the specific illustration given, I have shown the tubes 16 and 17 forming partial loops with forwardly extending lower ends, it will be understood that such tubes may, if desired, be straight or shaped as the conventional rear stays of a bicycle, with springs securing their lower ends to the rear fork.

While in the foregoing description I have set forth a specific preferred structure, it will be understood that considerable variation may be made in the details of construction without departing from the spirit of my invention. The foregoing detailed description has been given for clearness of understanding only, and no unnecessary limitations should be understood therefrom, but the appended claims should be construed as broadly as permissible, in view of the prior art.

I claim:

1. In a bicycle frame of the character set forth, having head, hanger and cluster members, a supporting member adapted at its rearward end to engage a rear wheel shaft, spring means connecting the forward end of said supporting member with said hanger member, said means being adapted to permit movement of the forward portion of said supporting member relative to said hanger member, a pair of rearwardly extending tubes attached to said cluster member and having their lower portions extending below and forwardly of said rear wheel shaft, and spring means connecting the forward ends of said tubes and said supporting member at a point forward of said wheel shaft and providing a spring fulcrum for said rear wheel shaft and by means of which said first-mentioned spring means is flexed.

2. In a bicycle frame of the character set forth having head, hanger and cluster members, a supporting fork member having its rear ends engaging and supporting a rear wheel shaft, said fork members being each equipped with integral bosses having a vertical aperture therethrough, said bosses being forward of said wheel shaft, spring means connecting the forward end of said supporting fork member with said hanger member, springs on either side of said bosses, a slidable rod securing said springs in position and extending through the aperture of each boss, and a pair of tubes extending rearwardly of said rear wheel shaft and then below and forwardly thereof, said tube ends being connected to the lower ends of said slidable rods.

EARL E. PEASE.